Figure 1:
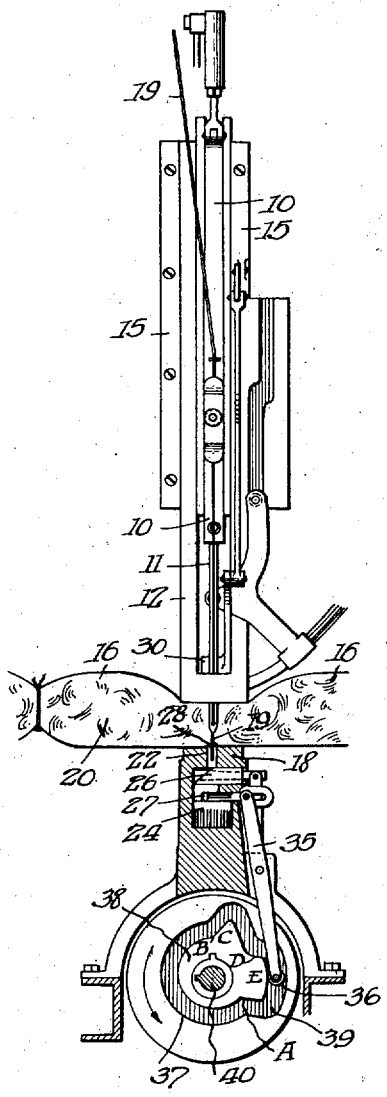

G. DILLON.

MATTRESS TUFTING MACHINE.

APPLICATION FILED OCT. 10, 1921.

Reissued Dec. 27, 1921. 15,253.

2 SHEETS—SHEET 1.

Inventor:
Guy Dillon,
By Fisher Towle Clapp & Sears.
Attys.

G. DILLON.

MATTRESS TUFTING MACHINE.

APPLICATION FILED OCT. 10, 1921.

Reissued Dec. 27, 1921. 15,253.

2 SHEETS—SHEET 2.

Inventor:
Guy Dillon,
By Fisher Fowle Clapp & Sears.
Attys

UNITED STATES PATENT OFFICE.

GUY DILLON, OF INDIANAPOLIS, INDIANA, ASSIGNOR, BY MESNE ASSIGNMENTS, TO SIMMONS COMPANY, OF KENOSHA, WISCONSIN, A CORPORATION OF DELAWARE.

MATTRESS-TUFTING MACHINE.

15,253. Specification of Reissued Letters Patent. Reissued Dec. 27, 1921.

Original No. 1,211,924, dated January 9, 1917, Serial No. 96,223, filed May 8, 1916. Application for reissue filed October 10, 1921. Serial No. 506,901.

*To all whom it may concern:*

Be it known that I, GUY DILLON, a citizen of the United States, residing at Indianapolis, in the county of Marion and State of Indiana, have invented certain new and useful Improvements in Mattress-Tufting Machines, of which the following is a specification.

The final operation in the manufacture of bed mattresses consists, generally, in tufting the mattresses; that is to say, the upper and lower sides of the ticks are tied together at uniformly spaced points, so as to hold the mattress fillings in place. This tying together of the side covering of the mattresses is accomplished by means of a suitable twine which is passed in two slightly separated strands in the form of a loop through the mattresses, so as to bind in a part of the fillings, the twine being tied together at the bottom of the mattresses in order to complete the bands, after which the strand of twine leading from the knot to the twine supply source is cut above the mattresses. The tufts, *per se*, are merely pieces of rove or slubs of cotton cut into suitable lengths which are inserted between the looped ends of the bands and the surface of the mattress coverings to prevent the twine from cutting through.

The tufting of the mattresses today is accomplished almost entirely by means of suitable machines—known in the art as tufting machines—in which, as above stated, the twine is tied at the bottom of the mattress while the supply of twine is located above the mattress, and as the twine cutting mechanism is also located above the mattress, a strand of twine, independent of the tied loop, extending from the knot to the twine cutting mechanism is wasted. As an average mattress contains about forty bands, it readily becomes apparent that there is an excessive waste in twine. But this waste is not the least, for the reason that after a mattress is completely tufted it must be turned over for the removal of the loose dangling ends of the twine, which must be done by hand, causing considerable loss in time and expense of labor.

This invention relates to a machine for tufting bed mattresses; and the object of the invention consists in the provision of a machine of the above character in which not only a considerable saving is effected in the amount of twine consumed in tufting the mattresses, but the time and labor heretofore necessary in turning the bottom sides of the mattresses up and in removing the loose dangling ends of the twine are eliminated.

Bearing the above objects of the invention in mind, the same are accomplished by means of the construction illustrated in the accompanying drawings, forming a part hereof, in which—

Figure 2:
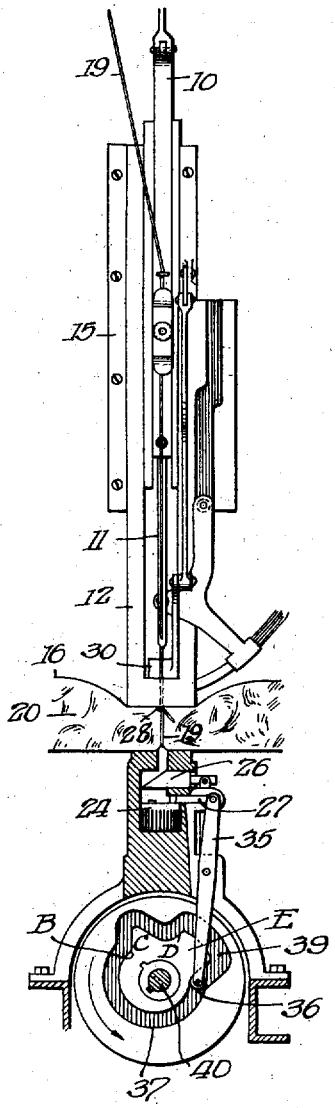
Figure 3:
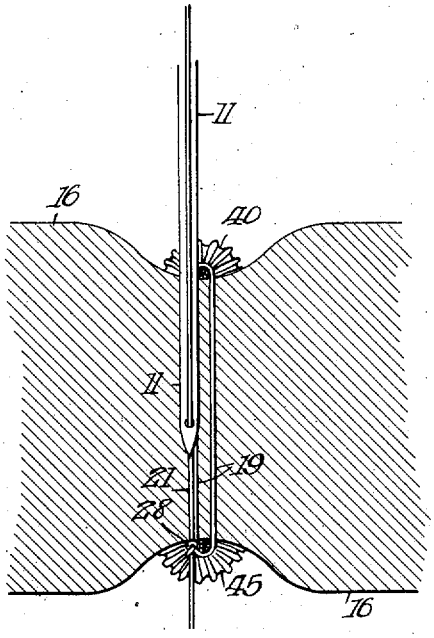
Figure 4:
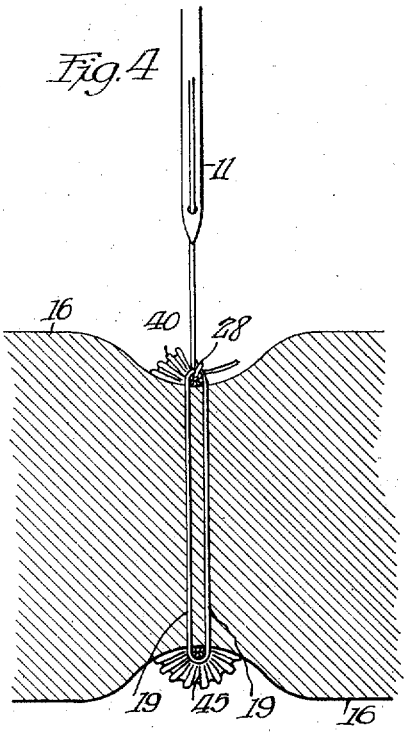

Figure 1 is a front elevation of the head of a mattress tufting machine with the base frame of the machine in section, showing the approximate position of the needle, immediately after the knot is drawn tight. Fig. 2 is a view similar to Fig. 1 except that the needle is shown entirely withdrawn from the mattress and the knot moved to the top of the mattress. Fig. 3 is a fragmentary detail sectional view through a bed mattress, on an enlarged scale, showing more clearly the position of the needle and knot illustrated in Fig. 1. Fig. 4 is a view similar to Fig. 3, showing more clearly the position of the knot at the conclusion of the tufting operation.

Referring to the drawings, 10 represents a reciprocating needle-bar which carries a needle 11. The bar 10 slides within a guide-frame 12, and the latter is movably mounted in a fixed head of the tufting machine. The bar 10 and guide-frame 12 are independently operated at the proper time through suitable levers, not shown. Twine 19 passes downward along the needle-bar 10 and passes through an eye near the point of the needle 11. When a mattress 16 is passed between the guide-frame 12 and base-frame 18, the first movement in the operation of the machine causes the guide-frame 12 to descend upon the upper surface of the mattress 16 and tightly compress the mattress filling 20, after which the needle-bar 10 descends and drives the needle 11 transversely through the mattress 16. The initial movement of needle 11 carries the free or loose end of twine 19 through the mattress and into an opening 22 in the base-frame 18 to a rotary twine gripping mechanism 24 where the free end of the twine is caught and held in restraint while needle 11 is withdrawn vertically from the mattress. When needle 11 reaches approximately the limit of its upward travel its position within head 15 is shifted slightly, causing the needle on its next stroke to penetrate the mattress 16 a little to one side of its first entrance so as to form a loop in the twine, the twine forming the loop being subsequently tied together at the bottom of the mattress and completing the band and within which a part of the filling 20 is caught. It will be observed, that on the second downward stroke of needle 11, twine 19 extends backward from the eye along both sides of the needle, the twine at this time assuming a U-shaped loop with the pointed end of the needle at the apex. This apex of the twine loop moves with the needle through the mattress and is brought into proper relation with a suitable hitch-forming mechanism 26 by which a hitch is formed in the twine, and through which hitch the second stroke of the needle inserts said U-shaped loop, after which cross hook 27 moves over and through said U-shaped needle-loop and by catching the end of twine 19 as it is freed by the rotary twine gripping mechanism 24 said free end is drawn through said U-shaped needle-loop and the formation of the knot is completed. Cross hook 27 after pulling the free end of twine 19 through the U-shaped loop retains its hold thereon while the needle 11 is being withdrawn from the mattress 16 and knot 28 is being drawn tight. When needle 11 has passed above the twine cutting knife 30 the latter is actuated so as to sever the twine at which time the cross hook 27 frees the lower end of twine 19 so as to allow the mattress to be shifted to the point where it is desired to form the next tie.

It will be noted from the above description that each band is composed of two strands of twine 19, which band is closed by means of the knot 28, and that, first, a third strand, indicated by the numeral 21, extending from the knot 28 up through the mattress 16 to the twine cutting knife 30, represents an amount of twine which is an absolute loss. Since an average mattress contains about forty of these bands it readily becomes apparent that an excessive amount of twine is wasted. Second, after a mattress is completely tufted, under the above method, the mattress must be turned bottom side up to permit removal of the long dangling ends of the third strands 21, which results in the loss of much time and expense of labor.

The hereinabove described mechanism and results secured thereby are substantially an embodiment of the construction shown in U. S. Letters Patent No. 1,193,708, August 8, 1916, and it is to eliminate the above mentioned waste of twine, and the expense of labor involved in truning the mattresses over, for the removal of the dangling waste ends of the twine, which constitutes the chief objects of the present invention, and the manner in which said objects are attained and the mechanism employed will now be described.

The construction and operation of the needle 11 and other mechanism in head 15 are the same as has heretofore been described. The rotary twine gripping mechanism 24, and hitch-forming mechanism 26 are actuated through suitable cams which are arranged in the rear of disk 39 (see Fig. 2) on the main driving shaft 40, and these are old in the art. The cross hook 27 is actuated through a rocking-arm 35 by means of a friction-roller 36 engaging a cam-groove 37 which surrounds cam 38, the latter being carried by the disk 39. The contour of cam 38 controls the movements of cross hook 27, through arm 35, substantially as follows: With cam 38 rotating in the direction of the arrow in Fig. 2, that portion of the face of the cam between points A and B has no effect upon roller 36 and arm 35, so that cross hook 27 is standing idle and at one side of the path of travel of needle 11. During this period of time, however, the other mechanism of the machine is operating to move needle 11 so as to thread twine 19 through the mattress in the formation of the band; the rotary twine gripping mechanism 24 also operating to catch and hold the end of the twine; and the hitch-forming mechanism 26 operating to twist the twine in the formation of the hitch. When cam extension C of cam 38, however, contacts roller 36 the latter is forced outward from the axis of the cam, causing the upper end of arm 35 to move cross hook 27 inwardly to catch the end of twine held in restraint by the rotary twine gripping mechanism, and as roller 36 passes over the apex of and down the opposite side of cam extension C, said cross hook 27 is moved backward and pulling the end of the twine (which is now released by the rotary twine gripping mechanism 24) through the U-shaped loop inserted through the hitch by the second stroke of the needle, completing the formation of the knot. Needle 11 now starting to move vertically in withdrawing from the mattress, cross hook 27 is suddenly moved inwardly and instantly freeing the twine end so as to allow the band to move along with the needle and move knot 28 through the mattress from the bottom to the top thereof—the band moving over the tufts 45 similar to a belt passing over pulleys. This sudden movement of hook 27 is to instantly free the twine before the needle has moved upward any considerable distance, and in fact the needle moves only a sufficient distance to pull the knot tight before the end of the twine is released by cross hook 27, after which the band is allowed to move along with the needle 11, said movement of hook 27 being accomplished by the contact of roller 36 with face D of cam extension E, said face extending approximately at right angles across the path of rotation of cam 38. It will be noted that extension E is of considerable length which is intended to hold the lower end of arm 35 outward and the upper end of said arm and cross hook 27 inward a sufficient period of time to allow knot 28 and free end of the twine to be freely withdrawn through opening 22 in base-frame 18, as the band is moved under the influence of needle 11. When knot 28 reaches the upper surface of the mattress, the needle 11 will have cleared twine cutting knife 30 allowing the latter to sever the strand of twine extending from knot 28 to the twine supply source. The twine end thus formed is comparatively short, corresponding in length to that of the original twine end and both ends being sufficiently short to require no further cutting.

Having thus fully described my said invention, what I desire to secure by Letters Patent, is—

1. In a mattress tufting machine, the combination, with a reciprocating needle for carrying the twine through the mattress, and forming a U-shaped loop in said twine, means for temporarily holding the end of the twine in restraint, hitch-turning means adapted to catch and turn a hitch in the twine, a cross-hook adapted to catch the end of the twine when freed by the twine holding means and for pulling said twine end through the U-shaped loop for completing the knot, and means actuating said cross hook for releasing the twine end when the knot is drawn tight and before the needle reaches the upper end of its stroke.

2. In a mattress tufting machine, the combination, with a reciprocating needle for carrying the twine through the mattress, and forming a U-shaped loop in said twine, means for temporarily holding the end of the twine in restraint, hitch-turning means adapted to catch and turn a hitch in the twine, a cross-hook adapted to catch the end of the twine when freed by the twine holding means and for pulling said twine end through the U-shaped loop for completing the knot, shifting means for moving said hook to free the twine when the knot is drawn tight and before the needle reaches the upper end of its stroke, and means for actuating said shifting means.

3. In a mattress tufting machine, the combination, with a reciprocating needle for carrying the twine through a mattress, and forming a U-shaped loop in said twine, means for temporarily holding the end of the twine in restraint, hitch-turning means adapted to catch and turn a hitch in the twine, a cross-hook adapted to catch the end of the twine when freed by the twine holding means and for pulling said twine end through the U-shaped loop for completing the knot, and a cam actuating said cross-hook for releasing the twine end when the knot is drawn tight and before the needle reaches the upper end of its stroke.

4. In a mattress tufting machine, the combination, with a reciprocating needle for carrying the twine through the mattress, and forming a U-shaped loop in said twine, means for temporarily holding the end of the twine in restraint, hitch-turning means adapted to catch and turn a hitch in the twine, a cross-hook adapted to catch the end of the twine when freed by the twine holding means and for pulling said twine end through the U-shaped loop for completing the knot, shifting means for moving said hook to free the twine when the knot is drawn tight and before the needle reaches the upper end of its stroke, and a cam for actuating said shifting means.

In witness whereof, I have hereunto set my hand and seal at Indianapolis, Indiana, this 22 day of Sept., A. D one thousand nine hundred and twenty-one.

GUY DILLON.